US010756600B2

(12) United States Patent
Tokoi et al.

(10) Patent No.: US 10,756,600 B2
(45) Date of Patent: Aug. 25, 2020

(54) AXIAL GAP ROTARY ELECTRIC MACHINE

(71) Applicant: Hitachi, Ltd., Chiyoda-ku, Tokyo (JP)

(72) Inventors: Hirooki Tokoi, Tokyo (JP); Yuji Enomoto, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 80 days.

(21) Appl. No.: 16/078,304

(22) PCT Filed: Feb. 24, 2016

(86) PCT No.: PCT/JP2016/055342
§ 371 (c)(1),
(2) Date: Aug. 21, 2018

(87) PCT Pub. No.: WO2017/145274
PCT Pub. Date: Aug. 31, 2017

(65) Prior Publication Data
US 2019/0058375 A1 Feb. 21, 2019

(51) Int. Cl.
*H02K 11/02* (2016.01)
*H02K 3/34* (2006.01)
(Continued)

(52) U.S. Cl.
CPC .............. *H02K 11/02* (2013.01); *H02K 1/146* (2013.01); *H02K 3/28* (2013.01); *H02K 3/345* (2013.01);
(Continued)

(58) Field of Classification Search
CPC .......... H02K 3/50; H02K 11/02; H02K 11/33; H02K 11/40; H02K 16/02; H02K 21/24;
(Continued)

(56) References Cited

U.S. PATENT DOCUMENTS 3,748,510 A * 7/1973 McNeal .................. H02K 3/38
310/71
4,147,398 A * 4/1979 Lill ...................... H01R 4/2462
310/184
(Continued)

FOREIGN PATENT DOCUMENTS

JP  2003-284279 A  10/2003
JP  2004-350357 A  12/2004
(Continued)

OTHER PUBLICATIONS

International Search Report (PCT/ISA/210) issued in PCT Application No. PCT/JP2016/055342 dated May 31, 2016 with English translation (four (4) pages).
(Continued)

*Primary Examiner* — Alex W Mok
(74) *Attorney, Agent, or Firm* — Crowell & Moring LLP

(57) ABSTRACT

To reduce an axial voltage while securing a high output, high efficiency, and assemblability of an axial gap rotary electric machine. An axial gap rotary electric machine includes: a stator, formed by arranging a plurality of core members circularly about a shaft in a direction in which magnetic lines are parallel with the shaft, the core member having at least an iron core and a coil wound around an outer circumference of the iron core; at least one rotor facing the stator with a predetermined air gap interposed therebetween in a shaft axial direction; and a housing having an inner circumferential surface opposing the stator and the rotor in a radial direction. The axial gap rotary electric machine further includes a wiring board that has: a bus portion continuous in the circumferential direction; a coil connection portion protruding from the bus portion and connected to the coil; and an external connection portion protruding from the bus portion. The wiring board is arranged at an outer circum-
(Continued)

ferential side of the plurality of circularly-arranged iron cores.

19 Claims, 15 Drawing Sheets

(51) Int. Cl.
    H02K 3/38      (2006.01)
    H02K 3/50      (2006.01)
    H02K 11/33     (2016.01)
    H02K 11/40     (2016.01)
    H02K 16/02     (2006.01)
    H02K 21/24     (2006.01)
    H02K 1/14      (2006.01)
    H02K 3/28      (2006.01)
    H02K 5/22      (2006.01)
    H02K 3/52      (2006.01)
    H02K 7/14      (2006.01)

(52) U.S. Cl.
    CPC ............ *H02K 3/38* (2013.01); *H02K 3/50* (2013.01); *H02K 3/522* (2013.01); *H02K 5/225* (2013.01); *H02K 11/33* (2016.01); *H02K 11/40* (2016.01); *H02K 16/02* (2013.01); *H02K 21/24* (2013.01); *H02K 7/14* (2013.01); *H02K 2203/03* (2013.01); *H02K 2203/06* (2013.01); *H02K 2203/09* (2013.01); *H02K 2203/12* (2013.01); *H02K 2213/03* (2013.01)

(58) Field of Classification Search
    CPC .......... H02K 2203/03; H02K 2203/06; H02K 2203/09; H02K 2203/12; H02K 3/345; H02K 3/38; H02K 1/146; H02K 2213/03; H02K 3/28; H02K 3/522; H02K 5/225; H02K 7/14
    USPC ........................................................ 310/71
    See application file for complete search history.

(56) References Cited

U.S. PATENT DOCUMENTS

| | | | | |
|---|---|---|---|---|
| 2007/0023421 A1* | 2/2007 | Kitamura | ............ | H02K 11/048 219/623 |
| 2007/0046140 A1 | 3/2007 | Shibukawa et al. | | |
| 2008/0169714 A1* | 7/2008 | Kataoka | ............ | G01D 5/20 310/71 |
| 2010/0133934 A1 | 6/2010 | Muramoto | | |
| 2012/0228972 A1 | 9/2012 | Moya et al. | | |
| 2012/0319512 A1 | 12/2012 | Nakagawa | | |
| 2013/0257185 A1* | 10/2013 | Akutsu | ............ | H02K 5/08 310/43 |
| 2013/0300222 A1* | 11/2013 | Nakano | ............ | H02K 9/22 310/43 |
| 2014/0009009 A1 | 1/2014 | Deguchi et al. | | |
| 2014/0132096 A1* | 5/2014 | Takeda | ............ | H02K 3/50 310/71 |
| 2015/0155750 A1* | 6/2015 | Hashimoto | ............ | H02K 1/02 310/43 |
| 2015/0295371 A1 | 10/2015 | Houzumi et al. | | |
| 2015/0357888 A1 | 12/2015 | Houzumi et al. | | |
| 2016/0013691 A1 | 1/2016 | Houzumi et al. | | |
| 2016/0020679 A1* | 1/2016 | Nakayama | ............ | H02K 5/22 310/58 |
| 2016/0065020 A1 | 3/2016 | Tokoi et al. | | |
| 2016/0268866 A1 | 9/2016 | Matsumoto | | |
| 2017/0194823 A1 | 7/2017 | Tokoi et al. | | |

FOREIGN PATENT DOCUMENTS

| | | | |
|---|---|---|---|
| JP | 2006-174551 A | 6/2006 | |
| JP | 2006-180618 A | 7/2006 | |
| JP | 2006-311674 A | 11/2006 | |
| JP | 2007-60794 A | 3/2007 | |
| JP | 2007-267525 A | 10/2007 | |
| JP | 2007-312560 A | 11/2007 | |
| JP | 2008-43005 A | 2/2008 | |
| JP | 2008-118833 A | 5/2008 | |
| JP | 2010-130803 A | 6/2010 | |
| JP | 2011-205875 A | 10/2011 | |
| JP | 2012-5307 A | 1/2012 | |
| JP | 2014-17915 A | 1/2014 | |
| JP | 2014-176207 A | 9/2014 | |
| JP | 2014-176210 A | 9/2014 | |
| JP | 2014-176214 A | 9/2014 | |
| JP | 2015-12675 A | 1/2015 | |
| JP | 2016-13053 A | 1/2016 | |
| JP | 2016-178833 A | 10/2016 | |
| WO | WO 2015/075813 A | 5/2015 | |
| WO | WO 2015/159332 | 10/2015 | |

OTHER PUBLICATIONS

Japanese-language Written Opinion (PCT/ISA/237) issued in PCT Application No. PCT/JP2016/055342 dated May 31, 2016 (four (4) pages).

Japanese-language Office Action issued in counterpart Japanese Application No. 2018-501458 dated May 28, 2019 with unverified English translation (seven (7) pages).

Japanese-language Office Action issued in Japanese Application No. 2018-501458 dated Dec. 24, 2019 with English translation (10 pages).

\* cited by examiner

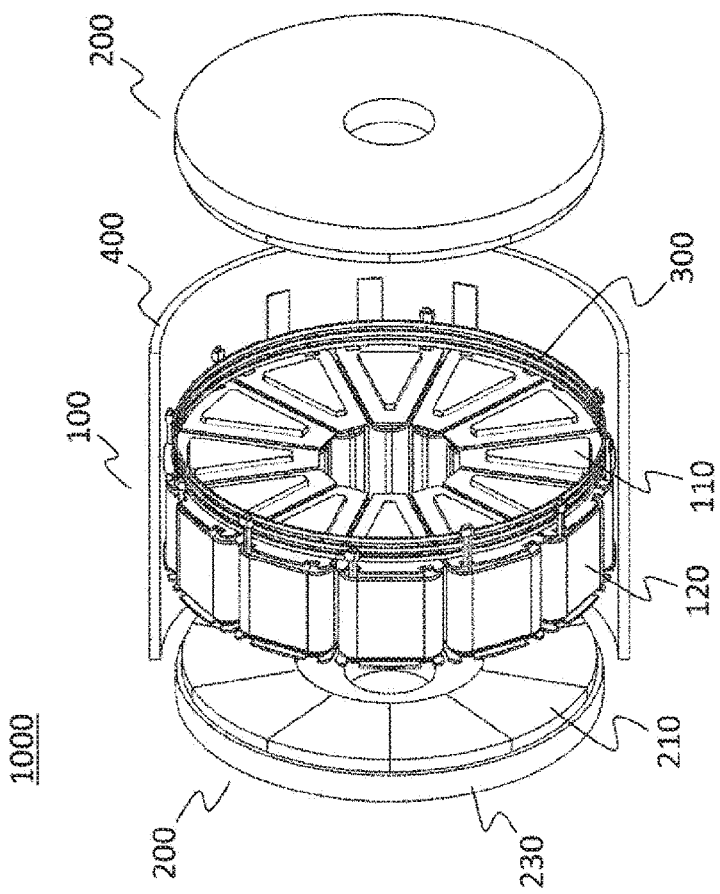
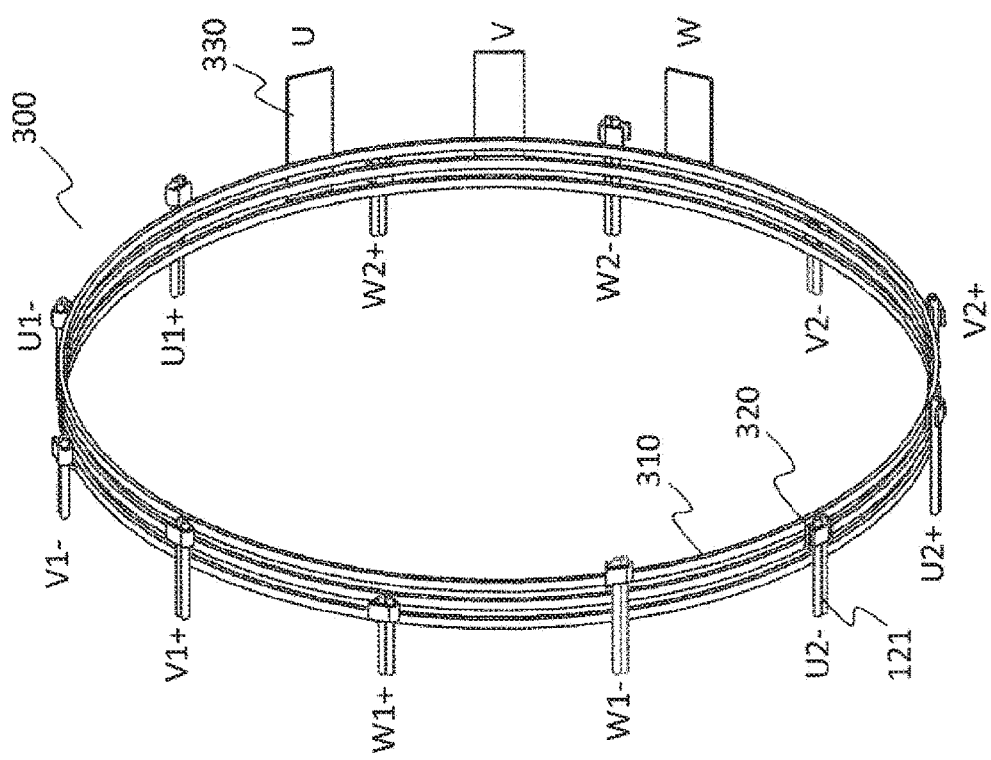

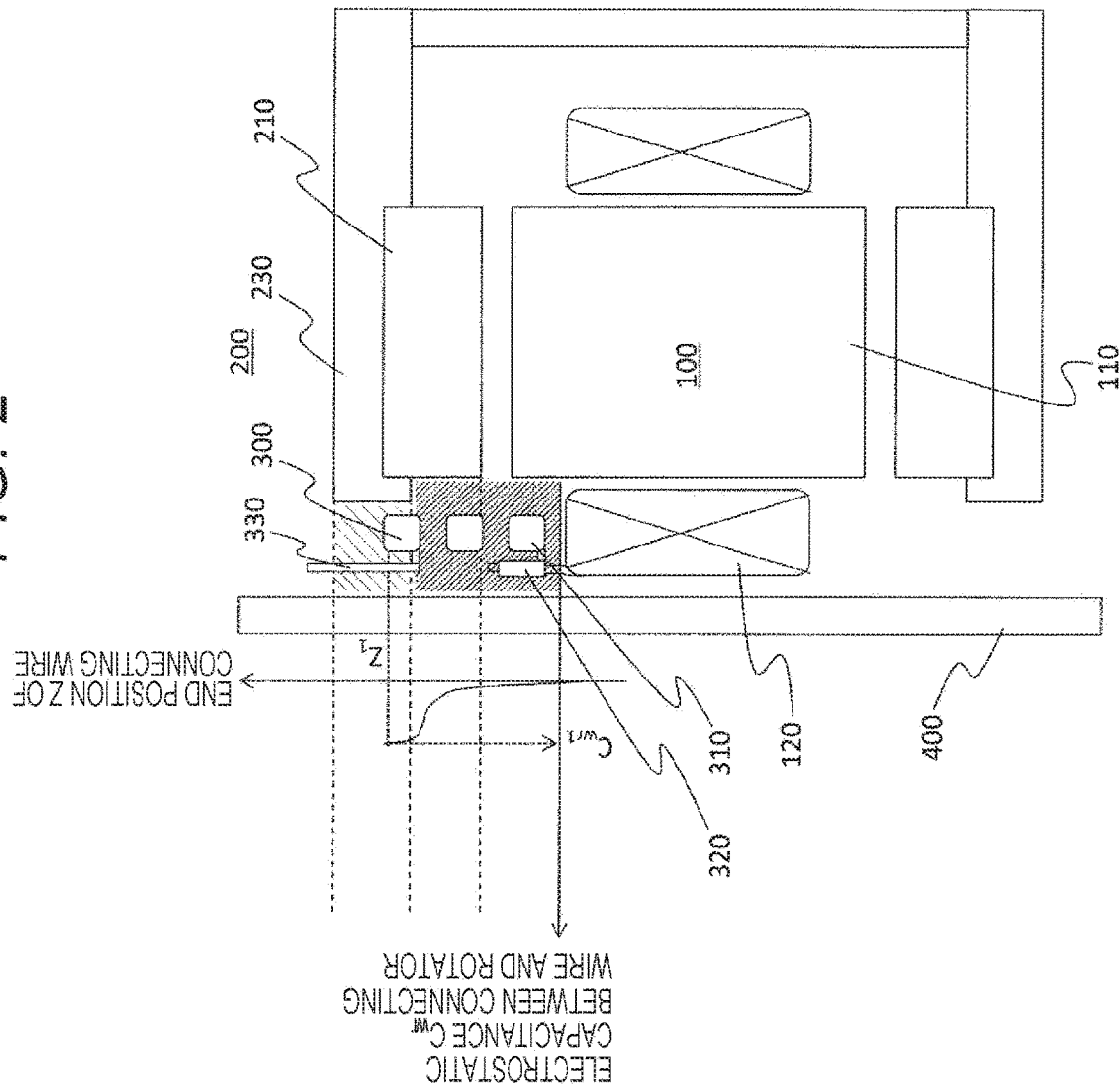

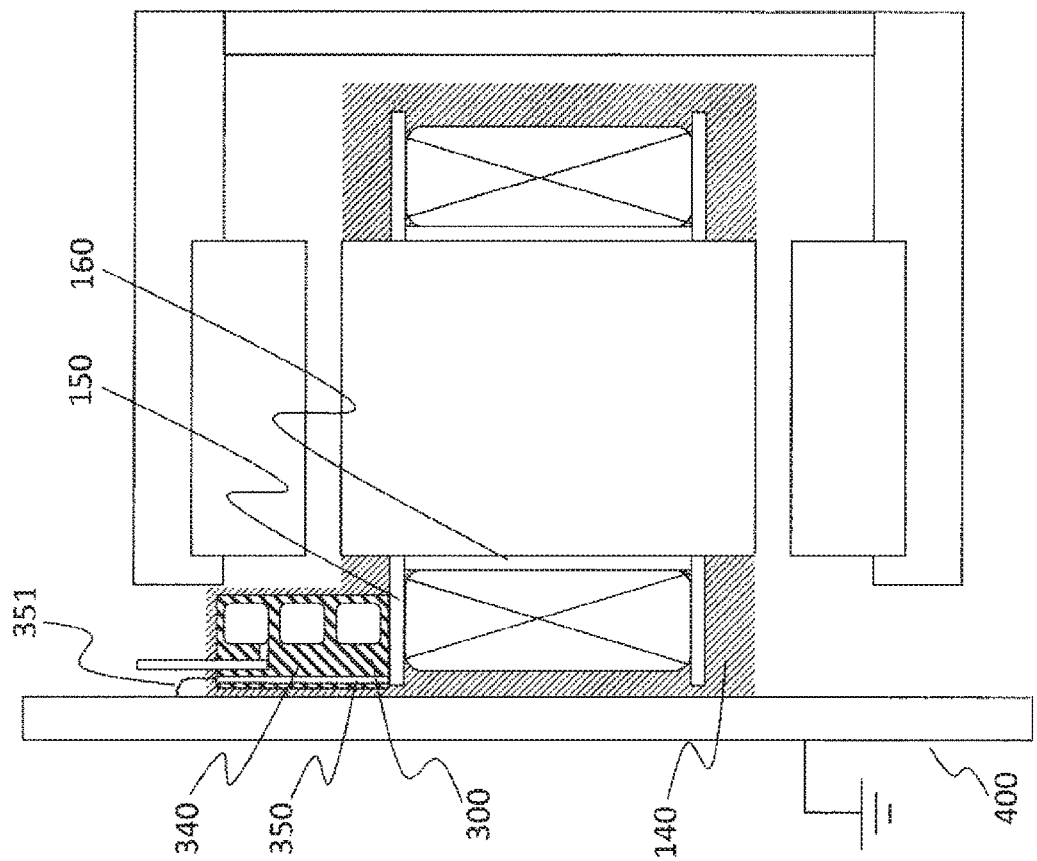
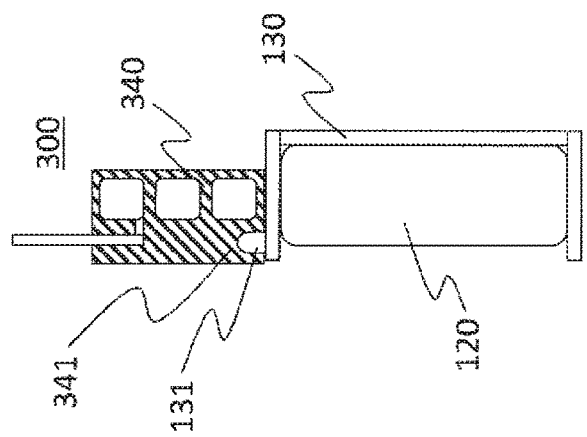

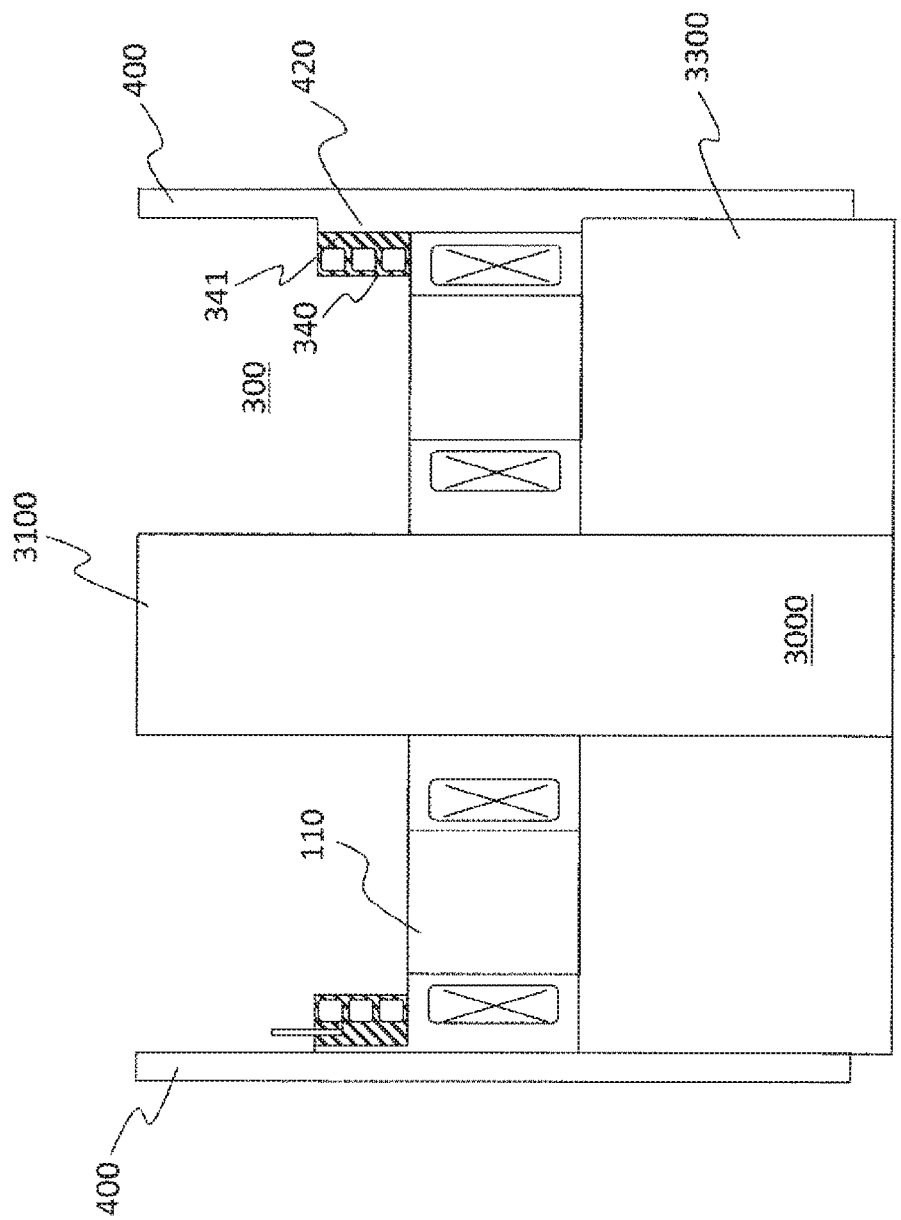

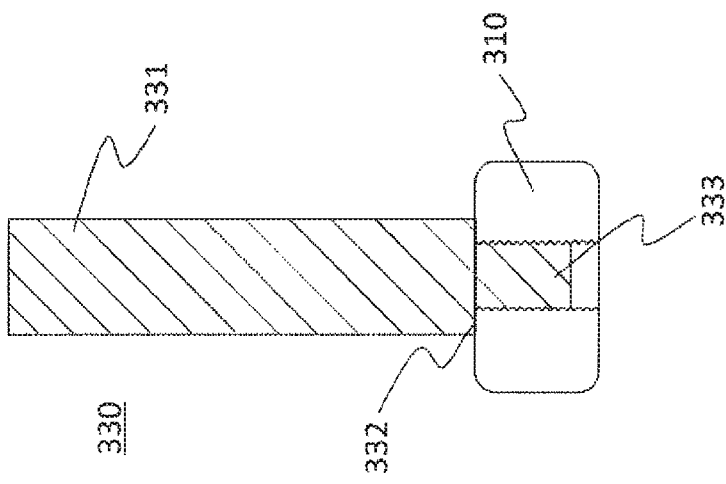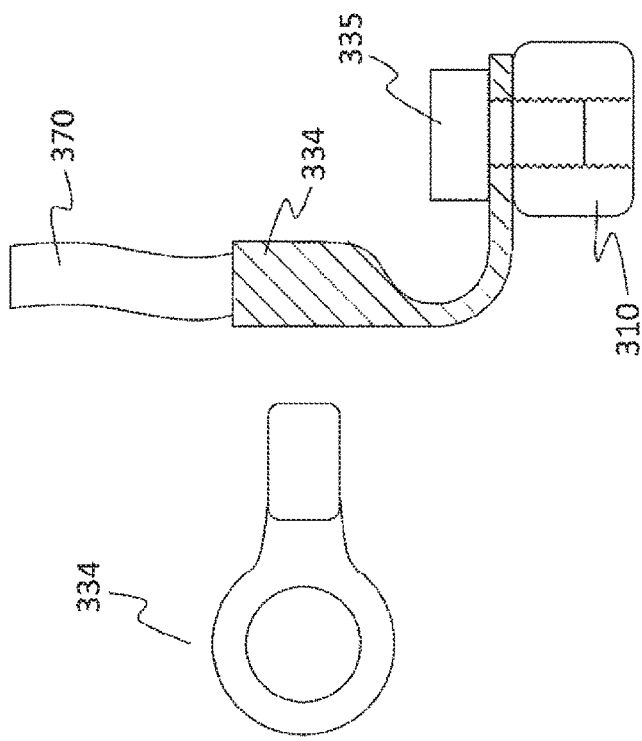

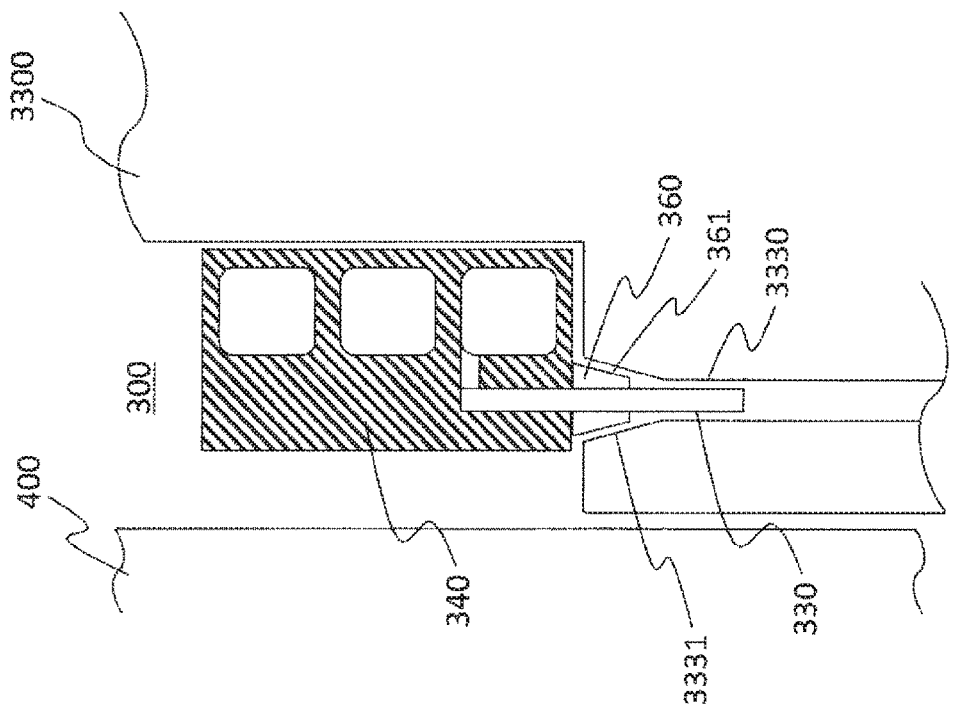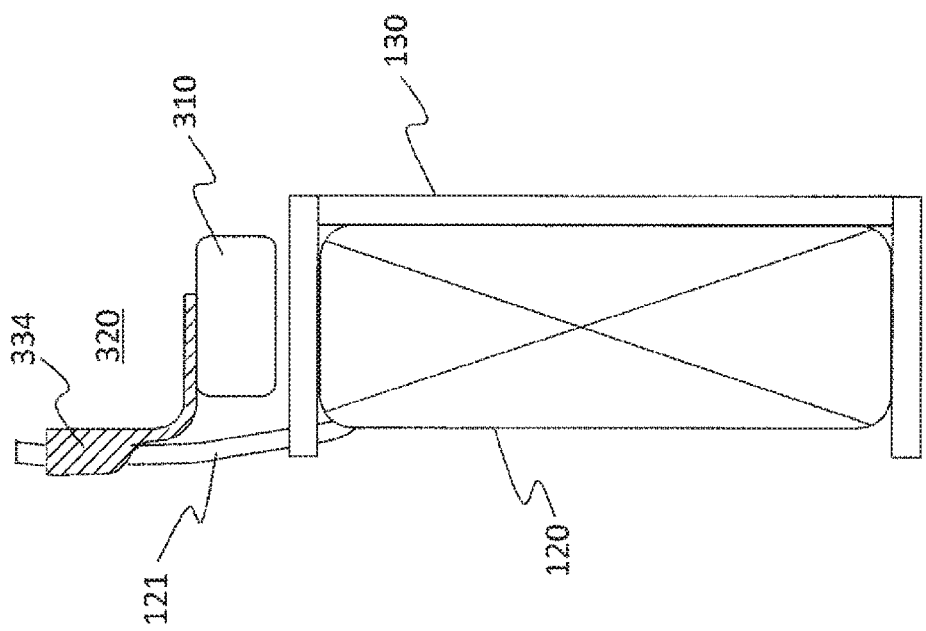

AXIAL GAP ROTARY ELECTRIC MACHINE

TECHNICAL FIELD

The present invention relates to an axial gap rotary electric machine, and particularly to an axial air gap rotary electric machine having a stator including a plurality of stator cores.

BACKGROUND ART

Rotary electrical machines driven by variable speed systems or inverters such as permanent magnet synchronous machines have increased for energy saving of electric equipment and the like. In these rotary electric machines, there is a case where a common mode voltage generated by an inverter is electrostatically coupled between a coil and a rotor to generate a potential difference (hereinafter referred to as an "axial voltage") between inner and outer rings of a bearing, which is a problematic. This is because an excessive axial voltage leads to insulation breakdown of a lubricating oil inside the bearing and causes electrolytic corrosion of the bearing due to a current (for example, PTL 1).

PTL 1 discloses a technique that performs shielding between a coil and a rotor to reduce an axial voltage. To be specific, PTL 1 discloses a radial gap rotary electric machine which is configured such that an insulating layer is provided on the entire stator surface facing a stator core and a rotor of a coil, and a conductive portion and an insulating portion are alternately formed on a surface of the insulating layer in a direction perpendicular to flow of a magnetic flux of the stator core. That is, the conductive portion is electrically connected to the core which is set to a ground potential. As a result, a large eddy current is not generated in the conductive portion, and it is possible to obtain the shielding between the coil and the rotor and to significantly reduce the electrostatic capacitance.

The above-described radial gap rotary electric machine is a structure of the current mainstream. In recent years, however, axial air gap rotary electric machines in which a stator and a rotor face each other with a predetermined air gap therebetween in a rotation axis direction have been also actively developed. In the axial air gap rotary electric machine, an opposing area between the stator and the rotor per unit size increases in proportion to about the square of a diameter as the diameter is enlarged, so that it is easy to achieve high output density and high efficiency. Therefore, the present rotary electrical machine has a structure suitable for thinning and flattening. Meanwhile, a plurality of cores are arranged in an electrically-insulated state, and the opposing area between the coil and the rotor is large, which provides a structure in which the axial voltage is likely to increase.

PTL 2 discloses a technique that reduces an axial voltage focusing on a structure peculiar to an axial air gap, such as a grounded structure of a plurality of cores, and a shield structure between a coil and a rotor, and a shaft. To be specific, PTL 2 discloses a configuration in which an end of an iron core protrudes from a bobbin around which a coil is wound, and an outer circumferential surface of the protruding iron core and an inner circumferential surface of a housing are electrically conducted via a conductive member to ground the iron core. In addition, PTL 2 discloses a configuration in which shielding between a shaft and a coil is obtained by arranging a tubular conductive member between a center portion on a rotating shaft side of a stator having an annular shape and the shaft and electrically conducting the conductive member and a housing.

CITATION LIST

Patent Literature

PTL 1: JP 2012-5307 A
PTL 2: JP 2014-17915 A

SUMMARY OF INVENTION

Technical Problem

Based on studies of the inventors, however, it has been found that it is important to consider a relationship between a connecting wire portion of the coil and the rotor in order to prevent the electrolytic corrosion of the bearing of the axial air gap rotary electric machine. The connecting wire drawn out from each coil of the axial air gap rotary electric machine is wired so as to run along an inner circumference of a housing and is drawn out to the outside from an opening of the housing. As described above, a gap area contributing to a torque output (the area of an opposing surface between the stator and the rotor) is proportional to about the square of the diameter in the axial air gap rotary electric machine. Thus, it is desirable to increase outer diameters of the stator core and the rotor as much as possible in order to achieve high output and high efficiency, and the coil and the housing are close to each other in many cases. As a result, the connecting wire protrudes toward the rotor and is arranged at a position opposing a side surface of the rotor, and the connecting wire and the rotor are electrostatically coupled. In particular, when the number of connecting wires is large or a conductor diameter of the connecting wire is large, it is difficult to ignore an electrostatic capacitance between the connecting wire and the rotor with respect to an electrostatic capacitance between the coil and the rotor, which greatly affects the axial voltage.

In order to reduce the electrostatic capacitance between the connecting wire and the rotor, there are a method (1) of increasing a distance between the connecting wire and the rotor, and a method (2) of reducing the opposing area between the connecting wire and the rotor. However, the method (1) results in reduction in an outer diameter of the rotor, and the method (2) results in reduction in an outer diameter of the core, that is, both the methods result in reduction in the gap area, which leads to a decrease of a motor characteristic, that is, decreases of the output and efficiency. Therefore, it is necessary to provide a means for reducing the electrostatic coupling between the connecting wire and the rotor without decreasing the output and efficiency.

In addition, when the increase of the axial voltage due to the connecting wire is a problem, a large number of connecting wires or thick connecting wires are often wired as described above so that molding work of the connecting wires is likely to be complicated. Thus, the simplification of the molding work is required. Further, the core and the winding are held by a mold in many axial air gap rotary electric machines, and thus, it is necessary to cover the entire stator also including the connecting wire with no gap using a molding die. If the sealing is not sufficient, the density of resin decreases due to a decrease in molding pressure, which leads to a decrease of strength, that is, a decrease of reliability. When a shape of the connecting wire is complicated, it takes much time for the sealing measure of the resin.

An object of the present invention is to reduce an axial voltage while securing a high output, high efficiency, and assemblability of an axial gap rotary electric machine.

Solution to Problem

Although the present invention includes a plurality of means for solving the above-described problem, an example of an axial gap rotary electric machine of the present invention is an axial gap rotary electric machine including: a stator, formed by arranging a plurality of core members circularly about a shaft in a direction in which magnetic lines are parallel with the shaft, the core member having at least an iron core and a coil wound around an outer circumference of the iron core; at least one rotor facing the stator with a predetermined air gap interposed therebetween in a shaft axial direction; and a housing having an inner circumferential surface opposing the stator and the rotor in a radial direction. The axial gap rotary electric machine further includes a wiring board that has: a bus portion continuous in the circumferential direction; a coil connection portion protruding from the bus portion and connected to the coil; and an external connection portion protruding from the bus portion, and the wiring board is arranged at an outer circumferential side of the plurality of circularly-arranged iron cores.

In addition, according to another example of the axial gap rotary electric machine of the present invention, in the above-described axial gap rotary electrical machine, the rotor has a conductive portion made of a conductive member on an outer circumferential side, a first region in which the inner circumferential surface of the housing and the conductive portion of the rotor oppose each other in the radial direction and a second region, which is close to the stator than the first region and formed up to the side surface of the coil opposing the rotor, are formed, and the wiring board is arranged such that a ratio of the bus portion of the wiring board arranged in the second region is larger than a ratio of the bus portion of the wiring board arranged in the first region.

Advantageous Effects of Invention

According to the present invention, it is possible to reduce the axial voltage while securing the high output, high efficiency, and assemblability of the axial gap rotary electric machine. In addition, it is possible to enhance the reliability with respect to electrolytic corrosion of a bearing. Other objects, configurations, and effects which have not been described above become apparent from the following description.

BRIEF DESCRIPTION OF DRAWINGS

FIG. 1A is a perspective view of a motor according to a first embodiment of the present invention.

FIG. 1B is an enlarged perspective view of a wiring board of FIG. 1A.

FIG. 2 is a partial cross-sectional view of a motor illustrating a relationship of an electrostatic capacitance between a connecting wire and a rotor according to a second embodiment of the present invention.

FIG. 7 is a partial cross-sectional view of a motor according to a seventh embodiment of the present invention.

FIG. 8 is a partial cross-sectional view of a wiring board, a bobbin, and a winding according to an eighth embodiment of the present invention.

FIG. 9 is a cross-sectional view at the time of molding a stator according to a ninth embodiment of the present invention.

FIG. 12 is a partial cross-sectional view of an external connection portion and a bus portion according to a twelfth embodiment of the present invention.

FIG. 13A is a view illustrating a general crimp terminal. FIG.

FIG. 13B is a partial sectional view of an external connection portion and a bus portion according to a thirteenth embodiment of the present invention.

FIG. 14 is an enlarged partial cross-sectional view of the periphery of a wiring board at the time of molding a stator according to a fourteenth embodiment of the present invention.

FIG. 15 is a partial cross-sectional view of a wiring board, a bobbin, and a winding according to a fifteenth embodiment of the present invention.

DESCRIPTION OF EMBODIMENTS

Hereinafter, embodiments of the present invention will be described with reference to the drawings. Incidentally, the same name and reference sign will be attached to the same constituent elements having the same function in the respective drawings for describing the embodiments, and the repetitive description thereof will be omitted.

First Embodiment

Figure 1C:
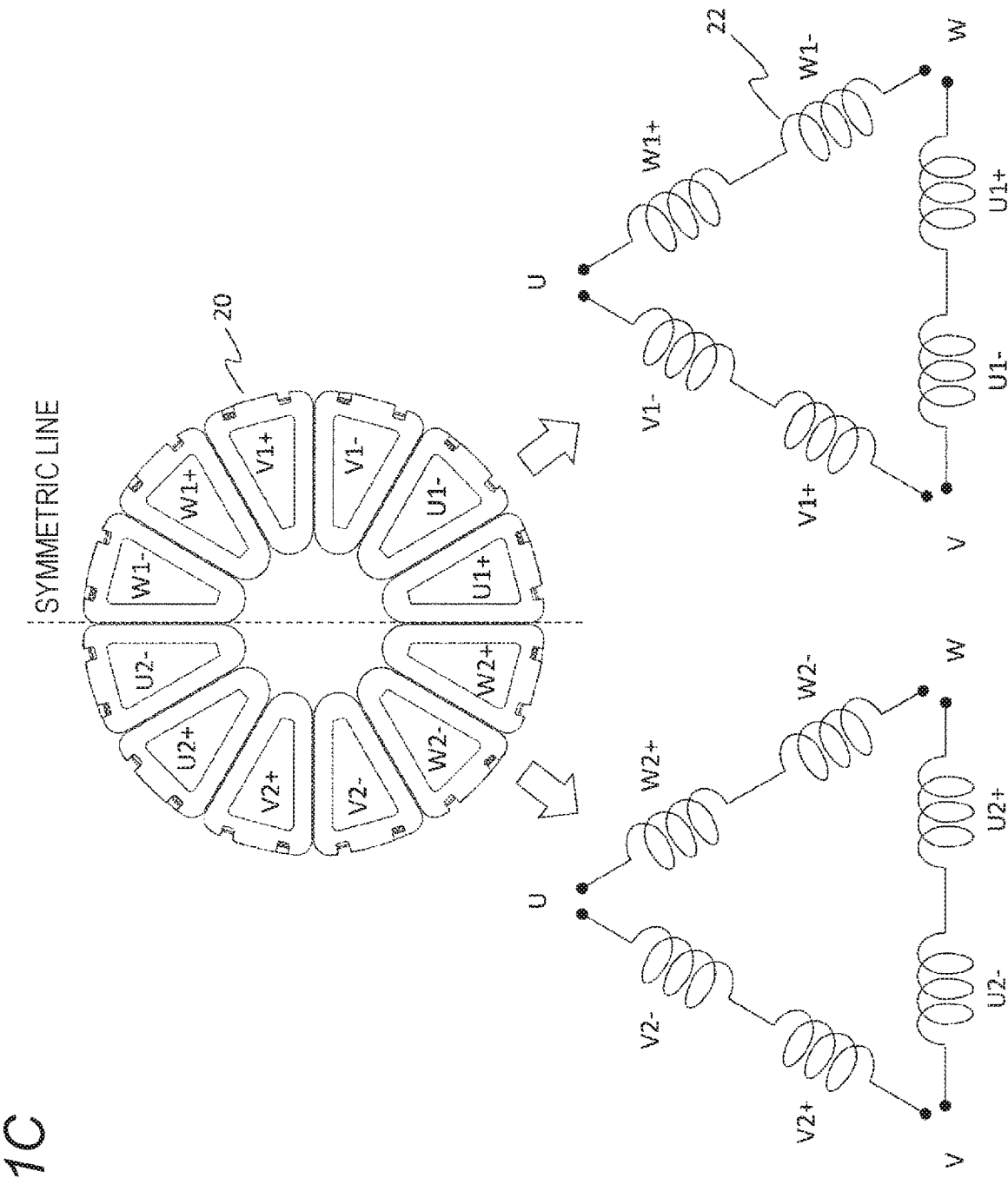
FIG. 1C is an axial end view of a stator and a connection diagram of a coil together with a coil number.

FIG. 1A is a perspective view illustrating a configuration of an axial gap motor according to a first embodiment of the present invention. In addition, FIG. 1B is an enlarged perspective view of a wiring board of FIG. 1A. FIG. 1C illustrates an axial end view of a stator and a connection diagram of each coil together with a coil number.

A motor 1000 is a so-called double rotor type rotary electric machine in which a stator 100 having a substantially annular donut shape is arranged so as to face two discshaped rotors 200 so that the rotors 200 sandwich the stator 100 from a shaft direction. Regarding the specification, the motor includes three phases, ten poles, and twelve slots. A winding is configured as a two-serial/two-parallel delta connection with two wires. Here, the stator 100 is configured by circularly arranging a plurality of core members about a shaft (in this example, twelve sets of core members are provided) as illustrated in FIG. 1A. The core member is formed of a columnar iron core (core) 110 having a trapezoidal or fan-shaped side surface at both ends, a bobbin which has a tubular portion having an inner diameter substantially coincident with an outer diameter of the iron core, and a coil (winding) 120 wound around an outer tubular portion of the bobbin. The stator 100 is supported as each of the circularly-arranged core members and an inner circumferential surface of a housing 400 are integrally molded with resin (not illustrated).

A wiring board 300 configured using a conductor is arranged on an end surface in a rotation axis direction of the stator 100 on a side of the coil 120 facing the rotor 200 and on an outer diameter side of the iron core 110. As illustrated in FIG. 1B, the wiring board 300 is formed of three annular bus portions 310, four coil connection portions 320 provided in each of the bus portions, and external connection portions 330 provided one by one for each bus portion. A lead wire 121 from which an end of an electric wire of each coil is drawn out is connected to the coil connection portion 320 by caulking, welding, soldering, or the like. In the two-serial/two-parallel connection, a series Portion is continuously wound, and the two lead wires 121 are drawn out from each coil so that 24 lead wires 121 in total are formed. The sign of the coil number illustrated in FIG. 1C indicates a direction (clockwise or counterclockwise) of a current flowing through the coil. In the present embodiment, adjacent in-phase coils are continuously wound while reversing a winding direction in order to simplify the manufacture of the winding. Only one kind of combination of winding directions is used, and six pairs of winding directions are arranged in a circumferential direction so that current directions of the adjacent phases, for example, U1- and V1-, are coincident with each other in a connection step. The external connection portion 330 is connected to a primary-side power supply (not illustrated).

The rotor 200 is formed of a permanent magnet 210 opposing a side surface of an end of the iron core 110, a back yoke (not illustrated) arranged on a back surface of the permanent magnet, and a yoke 230 which supports and couples the permanent magnet and the back yoke so as to rotate together with the shaft. The yoke 230 is made of a conductive member such as metal. Although iron is used in the present embodiment, the invention is not limited thereto, and aluminum or stainless steel (SUS or the like) may be used. The shaft is rotatably coupled to an end bracket (not illustrated) via a bearing. The end bracket is fixed to side surfaces at both ends of the housing. A terminal box (not illustrated) is provided on an outer circumferential side surface of the housing, and a primary-side electric wire and a secondary-side electric wire (not illustrated), that is, the external connection portion is electrically connected to the terminal box via a terminal block.

The motor 1000 having such a configuration operates as follows. An output line of an inverter is connected to the primary side of the terminal block, and an AC current is caused to flow to the coil 120. As a result, a rotating magnetic field is formed in the stator 100, and a torque is generated by attraction and repulsion between the rotating magnetic field and a DC magnetic field formed in the rotor 200 by the permanent magnet 210. At this time, a common mode voltage of the inverter generated in the coil 120 is electrostatically coupled to the rotor side due to an electrostatic capacitance between the coil 120 and the rotor 200. As the rotor 200 has a potential, a potential difference is generated between the rotor 200 and the housing 400 which is set at a ground potential. This potential difference affects between inner and outer rings of the bearing and becomes an axial voltage.

An axial voltage Vb caused by a common mode voltage Vcom is expressed by the following [Formula 1].

$$V_b = V_{com} \frac{C_{wr}}{C_{wr} + C_{rf} + C_b} \quad \text{[Formula 1]}$$

Here, Cwr represents the electrostatic capacitance between the coil and the rotor, Crf represents an electrostatic capacitance between the coil and a frame, that is, the housing or the end bracket, and Cb represents an electrostatic capacitance between the inner and outer rings of the bearing.

Cwr is a combined capacitance formed between the wiring board functioning as the connecting wire and a rotor side surface, between the coil and a rotor disc, and between the coil and the shaft. The electrostatic capacitance between the wiring board and the rotor side surface depends mainly on a radial cross-sectional area of the bus portion arranged in the circumferential direction. Compared with a structure in which lead wires from the coils are directly wound around an outer circumference of the rotor, the bus portion of the wiring board is made significantly compact and has an effect of suppressing the electrostatic capacitance between the wiring board and the rotor side surface. In addition, the workability of the wiring is significantly improved.

In the present wiring board structure, since the bus Portion 310 is arranged on the outer circumferential side of the plurality of circularly-arranged iron cores 110 to be close to the rotor 200 than the coil 120, it is possible to maximize an outer diameter of the iron core 110 and an outer diameter of the coil 120. As a result, it is possible to suppress the axial voltage without decreasing the output and efficiency of the motor.

The wiring board 300 is configured using a conductor such as copper and aluminum. The conductor may be subjected to surface treatment as necessary.

Incidentally, the double rotor type motor has been described as an example in the present embodiment, but the invention can also be applied to an axial air gap motor having another structure. A cross section of the bus portion of the present embodiment is substantially square, but may be rectangular, circular, elliptical, or the like. Although the single bus portion is provided for each phase, the bus portion may be divided into a plurality of portions. The bus portions of the respective phases may be arranged in the radial direction without being limited to the arrangement in the axial direction. From the viewpoint of reducing the axial voltage, it is desirable to set the cross-sectional shape of the bus portion and the arrangement of the bus portions of each phase such that a projected area of the bus portion as viewed from the rotor in the axial direction becomes small. In addition, the number of phases, the slot combination, the connection structure, and the number of wires are not limited to the present example. Positions and the number of lead wires and a connection position to the bus portion thereof differ depending on the slot combination and a connection method. The invention may be applied to a synchronous reluctance motor, a switched reluctance motor, or an induction motor not including a permanent magnet. Further, the invention may be applied to a generator instead of the motor.

Second Embodiment

FIG. 2 schematically illustrates an enlarged cross section of a motor according to a second embodiment of the present invention. This drawing does not illustrate some components such as a back yoke, resin, a bobbin, and the like. In the present embodiment, a part or the entire part of a wiring board 300 is arranged in a region (space) that is positioned to be closer to a rotor 200 than a coil 120 and positioned on a housing 400 side in a radial direction of a rotation axis of an iron core 110 and/or the rotor 200.

Here, a region where an inner circumferential surface of the housing 400 and a conductive portion of the rotor 200 oppose each other in the radial direction is set to a first region, and a region which is close to the stator than the first region and formed up to a side surface of the coil 120 opposing the rotor 200 is set to a second region. Here, the conductive portion of the rotor corresponds to a yoke 230 when the yoke 230 is made of a conductive material such as iron, and to a permanent magnet 210 when the permanent magnet 210 is made of a conductive magnetic material of an iron type or the like. Incidentally, the conductive portion does not correspond to the permanent magnet 210 when the permanent magnet 210 is a non-conductive magnetic material such as ferrite. In FIG. 2, the permanent magnet 210 is formed using a ferrite magnet, and thus, an outer circumferential surface of the permanent magnet 210 becomes the second region. In the present embodiment, the wiring board 300 is arranged such that a ratio of the wiring board 300, particularly a bus portion 310 thereof, arranged in the second region is higher than a ratio thereof arranged in the first region.

FIG. 2 also illustrates a schematic relationship between an arrangement state of the bus portion 310 and an electrostatic capacitance Cwr. In this drawing, Cwr has a relationship with an end surface position of the bus portion when the bus portion is stacked in a rotation axis direction (herein defined as a Z direction) from an end surface of the coil. Here, when a height of the bus portion is equal to or lower than the coil, a distance between the bus portion and a conductive member of the rotor becomes large, and thus, Cwr is sufficiently small. Similarly, an increasing gradient of Cwr is small in a region where the height of the bus portion is lower than a position of the yoke. On the other hand, when the height of the bus portion is higher than the yoke, Cwr increases abruptly since the bus portion and the yoke oppose each other in close proximity.

As illustrated in FIG. 2, the most of the bus portion is arranged in the second region in the second embodiment, and thus, it is possible to suppress an increase of an axial voltage caused by the bus portion. From the viewpoint of suppressing the axial voltage, it is more preferable to arrange the entire bus portion in the second region. As a result, electrical discharge to a lubricating oil inside a bearing is suppressed, and electrolytic corrosion of the bearing is suppressed. In addition, the bus portion 310 is arranged to be closer to the rotor 200 than the coil 120, and accordingly, it is possible to maximize an outer diameter of the iron core and an outer diameter of the coil. As a result, it is possible to suppress the axial voltage without decreasing the output and efficiency of the motor.

In particular, the non-conductive ferrite magnet or the like is used for the permanent magnet, and thus, the second region is formed on the outer circumferential side surface of the permanent magnet. According to the present structure, it is possible to achieve both an increase of a magnet diameter and reduction of an electrostatic capacitance between a connecting wire and the rotor, so that it is possible to simultaneously realize a high output and high efficiency of the motor and reduction of the axial voltage.

Incidentally, a double rotor type motor has been described as an example in the present embodiment, but the invention can also be applied to an axial air gap electric motor having a single rotor structure in which one rotor and one stator face each other. In addition, the invention may be applied to a synchronous reluctance motor, a switched reluctance motor, or an induction motor not including a permanent magnet. Further, the invention may be applied to a generator instead of the motor.

Third Embodiment

Figure 3:
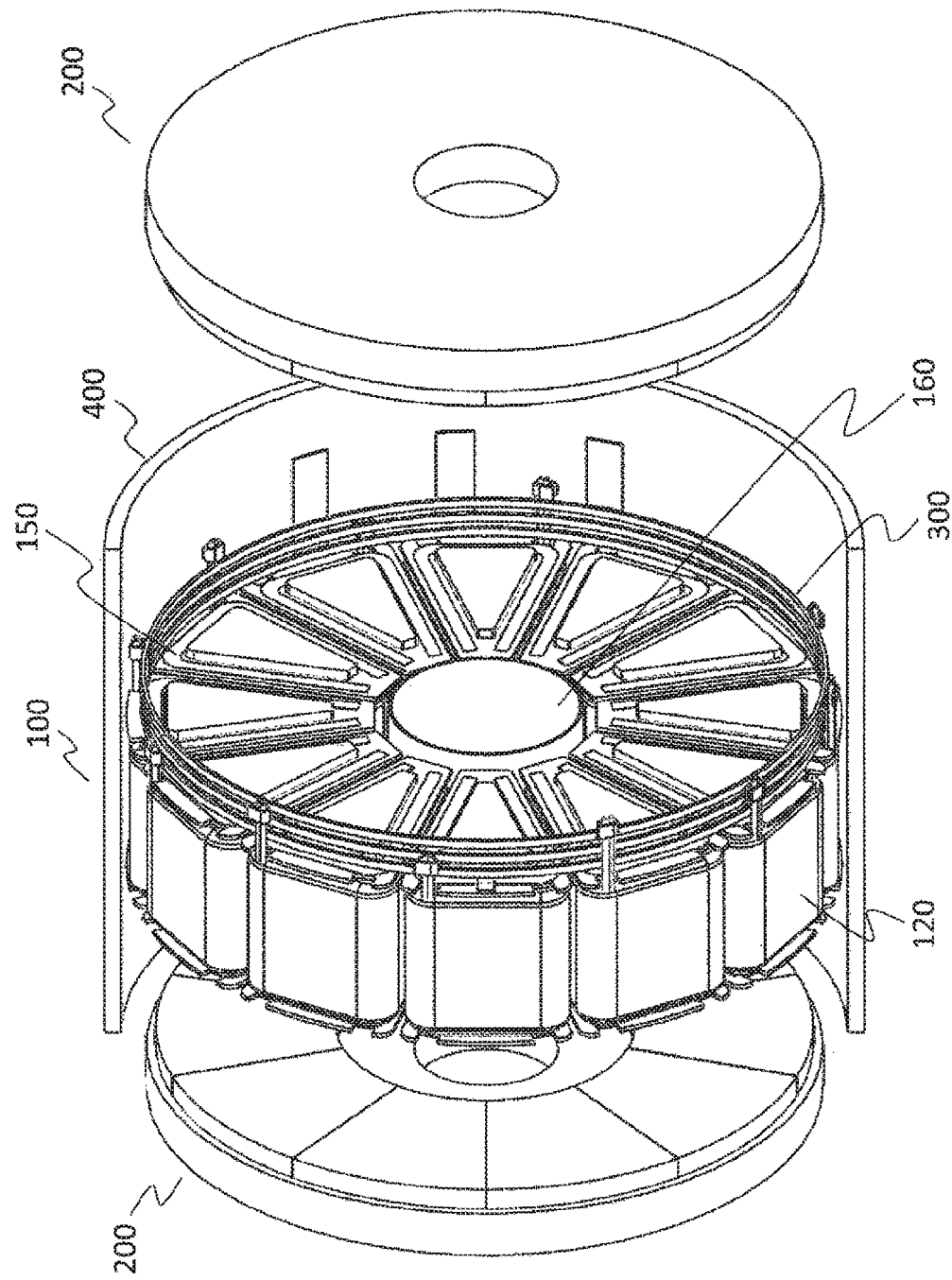
FIG. 3 is a perspective view of a motor according to a third embodiment of the present invention.

A third embodiment of the present invention is characterized in that shielding between an end surface of a coil in a shaft direction opposing a rotor and a shaft is performed in a motor having an open-slot iron core. FIG. 3 illustrates a perspective view of the motor according to the third embodiment of the present invention. The motor has the open-slot iron core whose cross section is always substantially trapezoidal. The iron core is insulated from the coil by a bobbin. A flange of the bobbin is arranged on the end surface of the coil. A first conductive member 150 is arranged on a side of the flange facing the rotor over the entire circumference except for an inner circumferential side. In addition, a second conductive member 160 is also arranged on an inner circumferential surface of resin opposing the shaft. These conductive members are electrically connected to a housing 400.

In general, an opposing area between the coil and the rotor becomes large in the open-slot iron core, and thus, Cwr is likely to be larger than that in the case of an iron core shape having a flange. In the present structure, however, it is possible to suppress an electrostatic capacitance between the coil and the rotor even with the shape of the open-slot iron core. When the present structure and the arrangement of the wiring board 300 illustrated in each of the above embodiments are used together, it is possible to sufficiently suppress an axial voltage regardless of the shape of the open-slot iron core.

Fourth Embodiment

A fourth embodiment of the present invention is characterized in that a core member, a wiring board, and a housing are integrally molded.

Figure 4:
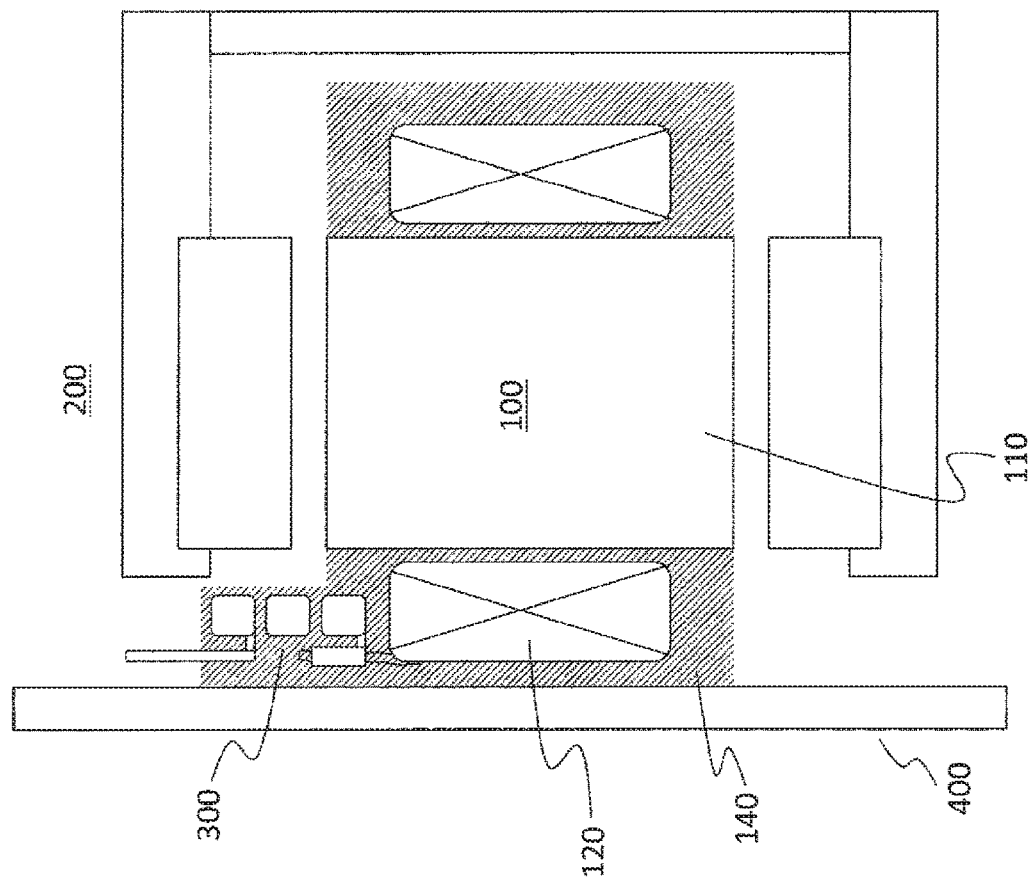
FIG. 4 is a partial cross-sectional view of a motor according to a fourth embodiment of the present invention.

FIG. 4 illustrates a partial cross section of a motor according to the fourth embodiment of the present invention. In the present embodiment, a wiring board 300 excluding an external connection portion, the core member including an iron core 110 and a coil 120, and a housing 400 are integrally molded with resin 140.

According to the present embodiment, the wiring board is insulated with the resin, and thus, the electrical reliability is improved. In addition, it is possible to firmly fix the wiring board without providing any special fixing means, so that it is possible to improve the reliability of the motor.

Fifth Embodiment

A fifth embodiment of the present invention is characterized in that an insulating member is provided on a wiring board and a bus portion is held by the insulating member.

Figure 5:
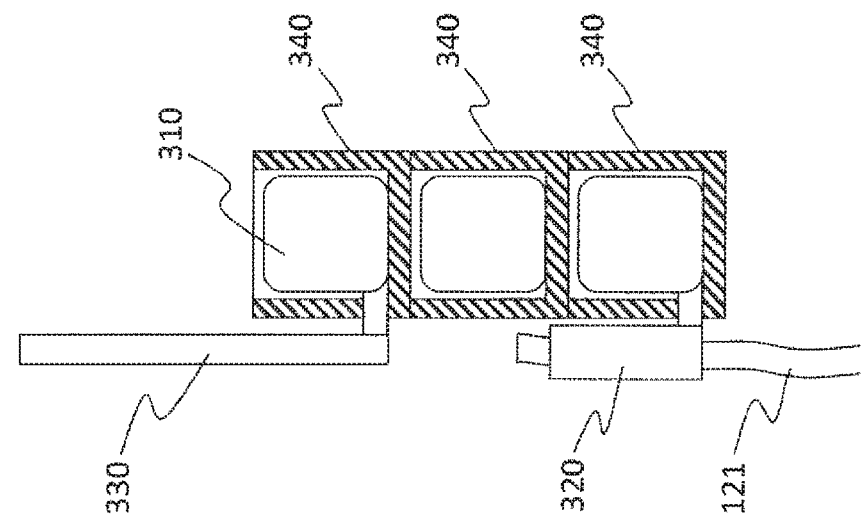
FIG. 5 is a partial cross-sectional view of a wiring board according to a fifth embodiment of the present invention.

FIG. 5 illustrates a cross-sectional view of the periphery of the wiring board of the fifth embodiment of the present invention. Here, an annular insulating member 340 which has a groove having a U-shaped cross section is provided, and a bus portion 310 is stored in the groove. A winding connection portion 320 and an external connection portion 330 protrude toward an outer diameter side of the insulating member 340.

According to the present embodiment, the bus portion is positioned so that the insulation between phases is maintained. Even when the wiring board, a core member, and a housing are integrally molded with an insulating member, it is possible to prevent contact between the bus portions. In addition, there is also the following effect of improving assemblability. At the time of assembling, the wiring boards of the respective phases stored in the insulating member may be arranged in a superimposed manner so that the workability is good. At the time of arranging the wiring boards, it is also possible to perform a process of connecting a lead wire and a coil connection portion for each phase, and it is easy to secure a connection space. In particular, when a radial thickness of the wiring board is restricted, it is difficult to perform connection work from the outer diameter side where it is difficult to secure a radial dimension of the coil connection portion. According to the present structure, it is possible to perform the connection work from an axial direction by providing the coil connection portion so as to protrude more than an in-phase bus portion in the axial direction.

The insulating member may be provided with a mechanism for positioning between insulating members. As a result, the assemblability at the time of stacking the wiring boards of the respective phases is improved.

Sixth Embodiment

A sixth embodiment of the present invention is characterized in that a wiring board is integrally molded with an insulating member before being incorporated in a motor.

Figure 6A:
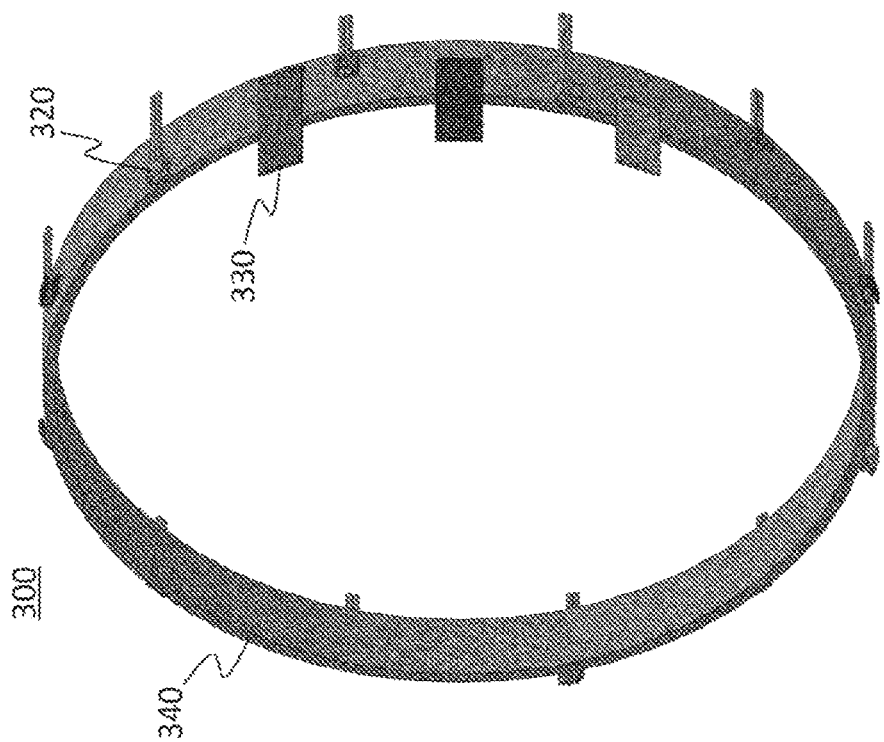
FIG. 6A is a perspective view of a wiring board according to a sixth embodiment of the present invention which illustrates a mold layer as an insulating member in a transparent state.
Figure 6B:
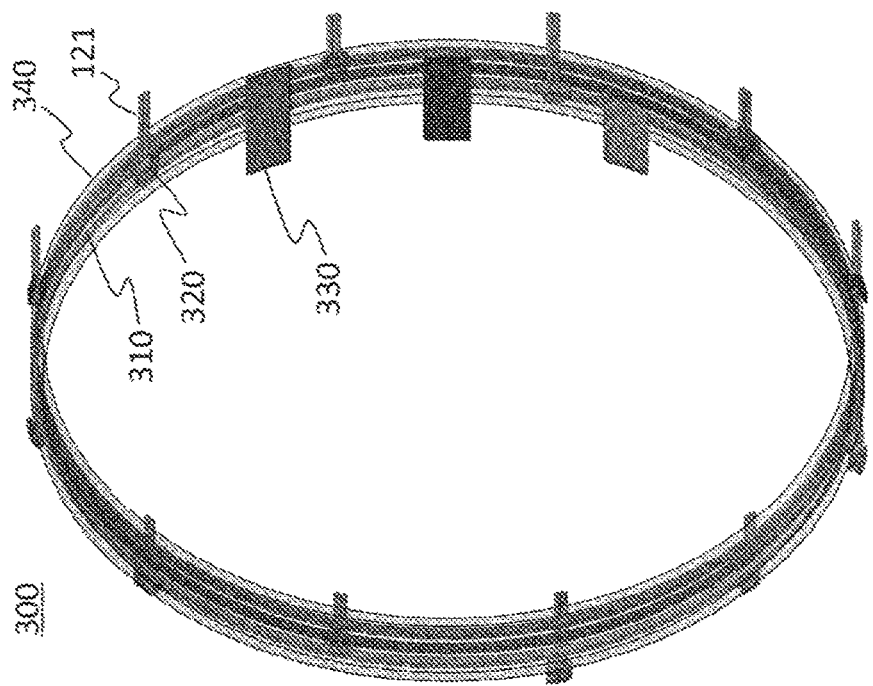
FIG. 6B illustrates the mold layer in an opaque state.

FIG. 6 illustrates a perspective view of a wiring board 300 according to the sixth embodiment of the present invention. As illustrated in FIG. 6(a) illustrating a mold layer in a transparent state, the wiring board is integrally molded with an insulating member 340 in a state where the respective phases of a bus portion 310 are separated. Incidentally, a winding connection portion 320 and an external connection Portion 330 are not molded as illustrated in FIG. 6(b) illustrating the mold layer in an opaque state.

According to the present embodiment, the insulation among the phases of the wiring board is secured, and further, the number of components of a stator is reduced, and the assemblability is improved. In addition, it is possible to suppress deformation of the wiring board during integral molding with a core member and a housing, and insulation failure due to the deformation.

Seventh Embodiment

A seventh embodiment of the present invention is characterized in that a ground connection portion is formed in an insulating member of a wiring board.

FIG. 7 illustrates a partial cross-sectional view of a motor according to the seventh embodiment of the present invention. As illustrated in FIG. 7, a wiring board 300 has an insulating member 340 formed by preliminary molding, and a ground connection portion 350 is provided on an outer diameter side of a bus portion inside the insulating member 340 so as to penetrate through the insulating member 340 in an axial direction. The ground connection portion 350 in the present drawing is provided at one or more places in a circumferential direction, and does not have an annular shape which is continuous in the circumferential direction. One end of the ground connection portion 350 is connected to a first conductive member 150 and a second conductive member 160 provided on a core and a stator. The other end of the ground connection portion 350 is connected to a grounded housing 400 via a ground wire 351.

According to the present embodiment, it is possible to reliably ground the core and a shielding material. In addition, there is no special component or structure for securing the grounding, and thus, the assemblability is improved.

Eighth Embodiment

An eighth embodiment of the present invention is characterized in that mechanisms for mutual positioning are provided in an insulating member of a wiring board and a bobbin.

FIG. 8 is a partial cross-sectional view of a wiring board 300, a bobbin 130, and a winding 120 according to the eighth embodiment of the present invention. As illustrated in FIG. 8, a positioning mechanism formed of a convex portion 131 is provided on a flange of the bobbin 130. An insulating member 340 of the wiring board 300 is provided with a positioning mechanism formed of a concave portion 341. The wiring board 300 is arranged on the flange of the bobbin 130 so that both the positioning mechanisms are engaged with each other.

According to the present embodiment, positioning of the wiring board becomes easy, and it is possible to suppress movement of the wiring board at the time of connecting a coil connection portion.

Ninth Embodiment

A ninth embodiment of the present invention is characterized in that an axial notch is provided at one end of an outer circumference of an annular insulating member of a wiring board to perform positioning in a circumferential direction.

FIG. 9 is a cross-sectional view at the time of molding a stator of the ninth embodiment of the present invention. As illustrated in FIG. 9, a molding die 3000 is formed of a center post 3100 forming an inner circumference of the stator, a lower die 3300 forming a lower surface of the stator, and an upper die (not illustrated) forming an upper surface of the stator. A concave portion 341 continuous in the axial direction is provided on an outer circumference of an insulating member 340 of a wiring board 300. In addition, a protrusion 420 corresponding to the concave portion 341 of the insulating member is provided in the axial direction on an inner circumference of a housing 400. According to the present embodiment, the wiring board and the housing are positioned in the circumferential direction by the concave portion and a convex portion. As a result, it is possible to suppress that electrical connection of a coil connection portion is damaged as the wiring board moves during molding. The convex portion of the housing also functions as a stopper against rotation of the stator with respect to a torque reaction force generated at the time of being operated as a motor, thereby improving the reliability of the motor.

A plurality of concave portions of the insulating member and convex portions of the housing may be provided in the circumferential direction. In addition, the insulating member may be provided with a convex portion, and the housing may be provided with a concave portion.

Tenth Embodiment

A tenth embodiment of the present invention is characterized in that mechanisms for mutual positioning are provided in an insulating resin portion of a wiring board and a molding die.

Figure 10:
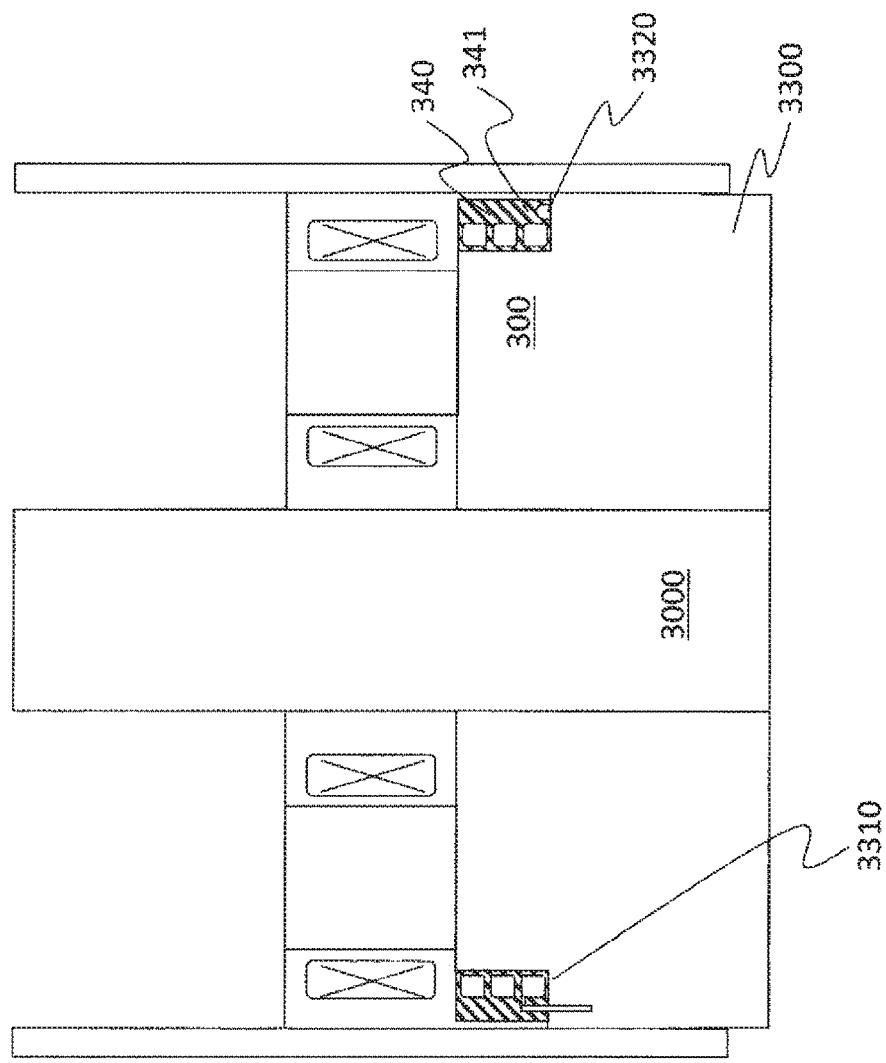
FIG. 10 is a cross-sectional view at the time of molding a stator according to a tenth embodiment of the present invention.

FIG. 10 illustrates a cross-sectional view at the time of molding a stator of the tenth embodiment of the present invention. The insulating resin portion of the wiring board is provided with a concave portion 341. A stepped portion 3310, configured to arrange a wiring board 300, is formed on a lower die 3300 of a molding die 3000. A convex portion 3320 is provided on a bottom surface of the stepped portion.

According to the present embodiment, the concave portion of the insulating resin portion and the convex portion of the lower die of the molding die are engaged with each other to be positioned. As a result, it is possible to suppress that electrical connection of a coil connection portion is damaged as the wiring board moves during molding.

A plurality of concave portions of the insulating member and convex portions of the lower die may be provided in the circumferential direction. In addition, the insulating member may be provided with a convex portion, and the lower die may be provided with a concave portion.

Eleventh Embodiment

An eleventh embodiment of the present invention is characterized in that a bus portion of a wiring board is formed to have an open structure.

Figure 11A:
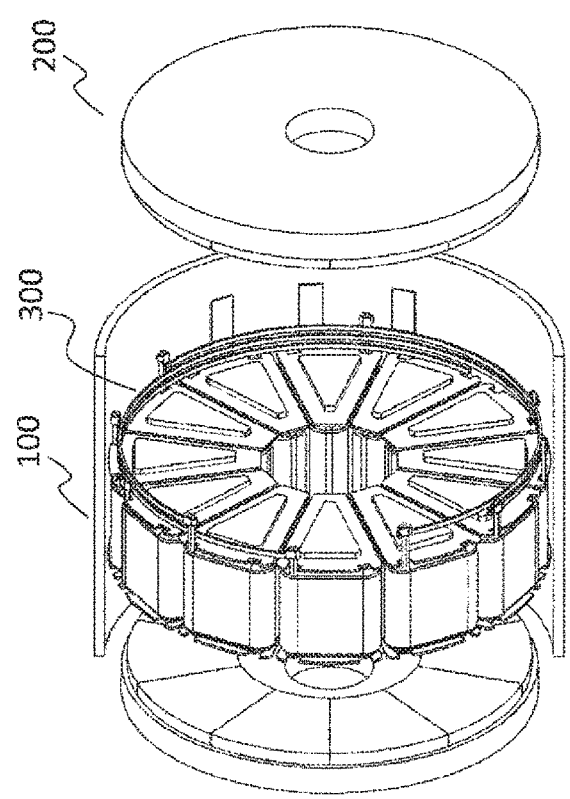
FIG. 11A is a perspective view of a motor according to an eleventh embodiment of the present invention.
Figure 11B:
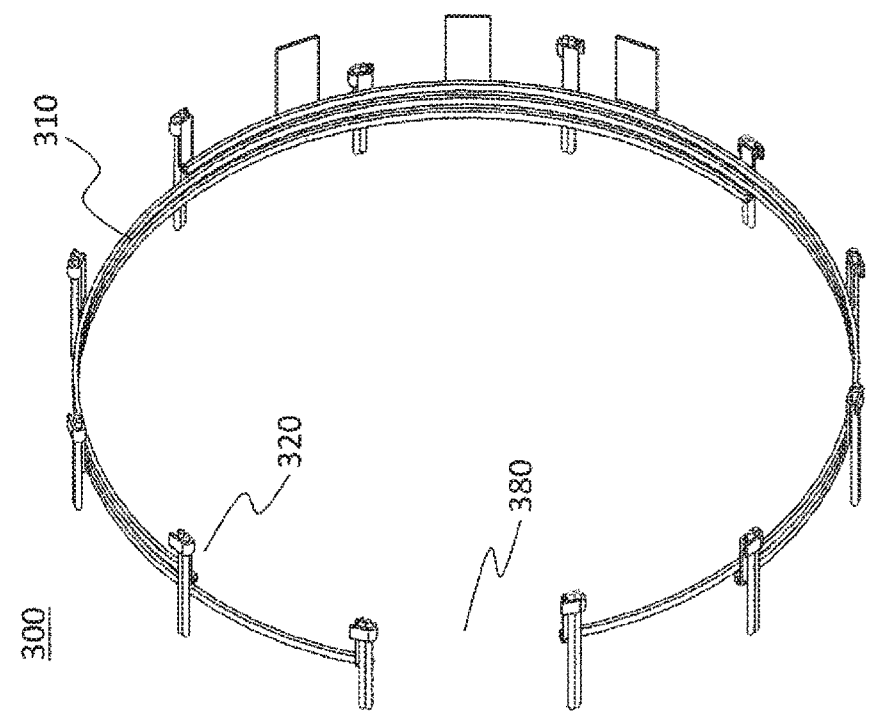
FIG. 11B is an enlarged perspective view of a wiring board according to the eleventh embodiment.

FIG. 11A illustrates a perspective view of a motor according to the eleventh embodiment of the present invention. FIG. 11B is an enlarged perspective view of the wiring board. A bus portion 310 has one open portion 380 in a circumferential direction.

According to the present embodiment, it is possible to reduce a use amount of a conductor of the bus portion. It is possible to improve a yield when the bus portion is manufactured by punching using a plate material. Further, it is also possible to manufacture the bus portion by folding a single conductor.

Twelfth Embodiment

A twelfth embodiment of the present invention is characterized in that an external connection portion is formed by connecting a bus portion and a separate terminal.

FIG. 12 illustrates a cross-sectional view of the external connection portion and the bus portion of the twelfth embodiment of the present invention. The external connection portion 330 is formed of a terminal 331 provided with a screw portion 333 at one end, and is connected to a screw hole provided in a bus portion 310 at the screw portion 333. The terminal 331 and the bus portion 310 are in contact with each other at a contact surface 332.

According to the present embodiment, a shape of the external connection portion does not depend on a shape of the bus portion, and thus, it is possible to arbitrarily change the shape of the external connection portion. Even if a structure of the primary side is changed, it is possible to connect the external connection portion without providing a connector or the like.

Incidentally, the external connection portion and the bus portion are connected by a screw mechanism in the present structure, but another connection means such as welding, soldering, and friction stir welding may be used.

Thirteenth Embodiment

A thirteenth embodiment of the present invention is characterized in that an external connection portion is formed by connecting a bus portion and a terminal to which an insulated electric wire is connected.

FIG. 13(a) illustrates a general-purpose round crimp terminal 334. FIG. 13(b) illustrates a cross-sectional view of the external connection portion and a bus portion 310 of the thirteenth embodiment of the present invention. The external connection portion is formed of the general-purpose round terminal 334 to which an insulated electric wire 370 is caulked. The round terminal 334 is bent so as to draw the insulated electric wire 370 in an axial direction. The external connection portion is connected to a screw hole of the bus portion 310 via a bolt 335.

According to the present embodiment, it is possible to impart shape flexibility to the external connection portion, and thus, it is possible to perform connection independent of a connection position or a shape of the primary side. For example, it is possible to easily connect the external connection portion to a terminal block arranged outside a housing.

Incidentally, the external connection portion and the bus portion are connected by a screw mechanism in the present embodiment, but another connection means such as welding, soldering, and friction stir welding may be used.

Fourteenth Embodiment

A fourteenth embodiment of the present invention is characterized in that a sealing piece is provided in an external connection portion when a wiring board is integrally molded with a core member and a housing.

FIG. 14 is a cross-sectional view of the periphery of the wiring board at the time of molding a stator of the fourteenth embodiment of the present invention. A wiring board 300 is covered with an insulating member 340 except for an external connection portion 330 and a coil connection portion (not illustrated), and a sealing piece 360, which has a tapered portion 361 whose cross section gradually decreases from an insulating member side to a distal end of an output terminal on an outer circumference thereof, is provided at a root of the external connection portion 330 protruding from the insulating member 340. In addition, a lower die 3300 is provided with an opening 3330 configured to store the external connection portion 330. A tapered portion 3331 corresponding to a shape of the sealing piece 360 is provided at the entrance of the opening 3330.

According to the present embodiment, it is possible to suppress a leakage of resin from the external connection portion during the integral molding. As a result, it is unnecessary to remove the resin which has been attached to the output terminal. It is possible to suppress a decrease in molding pressure caused by the leakage of the resin, and thus, it is possible to maintain a high filling density of the resin and to stably secure the degree of holding of the core member.

It is desirable to form the sealing member using resin, rubber, or the like. In addition, when it is configured with a dimensional relationship that allows a mold clamping pressure to be applied between the sealing member and the tapered portion of the lower die, it is possible to cause close contact between the sealing member and the lower die, and further, among the sealing member, the insulating member, and the external connection portion, so that the resin sealing effect is enhanced.

Fifteenth Embodiment

A fifteenth embodiment of the present invention is characterized in that a coil connection portion is formed by connecting a bus portion and a separate terminal.

FIG. 15 illustrates a partial cross-sectional view of a coil connection portion 320, a bus portion 310, a coil 120, and a bobbin 130 of the fifteenth embodiment of the present invention. The coil connection portion 320 is formed by bending a round terminal 334 and is welded to the bus portion 310. A lead wire 121 from the coil 120 is caulked to the round terminal 334.

According to the present embodiment, since a shape of the coil connection portion does not depend on a shape of the bus portion, it is possible to arbitrarily change the shape of the coil connection portion. By changing a terminal shape of the coil connection portion, it is possible to respond a change of the specification of a lead wire and the specification of the primary-side structure.

Incidentally, the example in which the round terminal is welded has been illustrated in the present embodiment, but a terminal or a connector of another shape may be used. The connection between the coil connection portion and the lead wire may be obtained by welding, soldering, friction stir welding, or the like without being limited to caulking. In addition, the connection between the coil connection portion and the bus portion may be obtained using another fastening means such as soldering, friction stir welding, screws, and bolts.

Sixteenth Embodiment

A sixteenth embodiment of the present invention is characterized in that irregularities are provided on a contact surface of a coil connection portion with respect to a lead wire, and crimping is performed without removing an insulating film on a surface of the lead wire.

Figure 16:
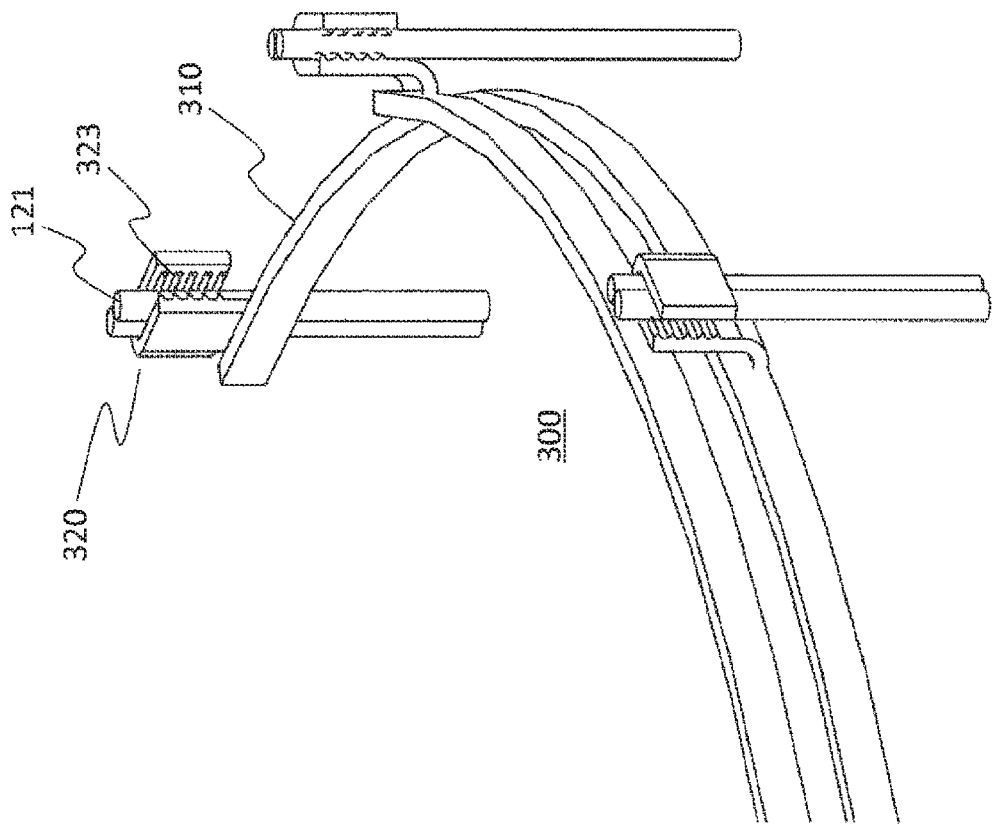
FIG. 16 is a partial perspective view of a wiring board of a sixteenth embodiment of the present invention.

FIG. 16 is an enlarged perspective view of a coil connection portion and a bus portion according to the sixteenth embodiment of the present invention. A bus portion 310 and a coil connection portion 320 are configured using the same member formed by punching a plate material and then folding the coil connection portion. Here, a plurality of protrusions 323, sufficiently deeper than a thickness of an insulating film which has been applied to the coil surface, are provided on the contact surface of the coil connection portion 320 with respect to a lead wire 121. The lead wire 121 is caulked to the coil connection portion 320 without removing the insulating film. The protrusion 323 on the contact surface with respect to the lead wire breaks the insulating film and penetrates deep up to a conductor portion of the coil.

According to the present embodiment, it is possible to perform the caulking work of the lead wire and the coil connection portion without performing a process of removing the insulation film of the lead wire. As a result, the assemblability is improved. Further, in the case of using a coil of an aluminum electric wire, a high-resistance oxide film is formed by removal of the insulating film, and an increase in contact resistance can be suppressed. Further, it is possible to perform waterproof treatment of covering a connecting portion between the aluminum electric wire and the coil connection portion made of copper with the resin by molding the coil connection portion integrally with a core member and a housing. Corrosion (galvanic corrosion) between dissimilar metals can be suppressed by suppressing moisture from entering the connecting portion. As a result, it is possible to adopt the aluminum electric wire without providing any special process, and to achieve weight reduction and cost reduction of a motor.

Incidentally, the example in which the bus portion and the coil connection portion are formed using the same member has been described, a separate terminal may be connected. A crimp terminal for an aluminum wire may be used. In addition, the protrusion of the coil connection portion is not limited to being integrated with the coil connection portion, and a sleeve containing irregularities or meshes may be inserted between the coil connection portion and the lead wire.

Seventeenth Embodiment

A seventeenth embodiment of the present invention is obtained by using the present invention for an industrial motor.

Figure 17:
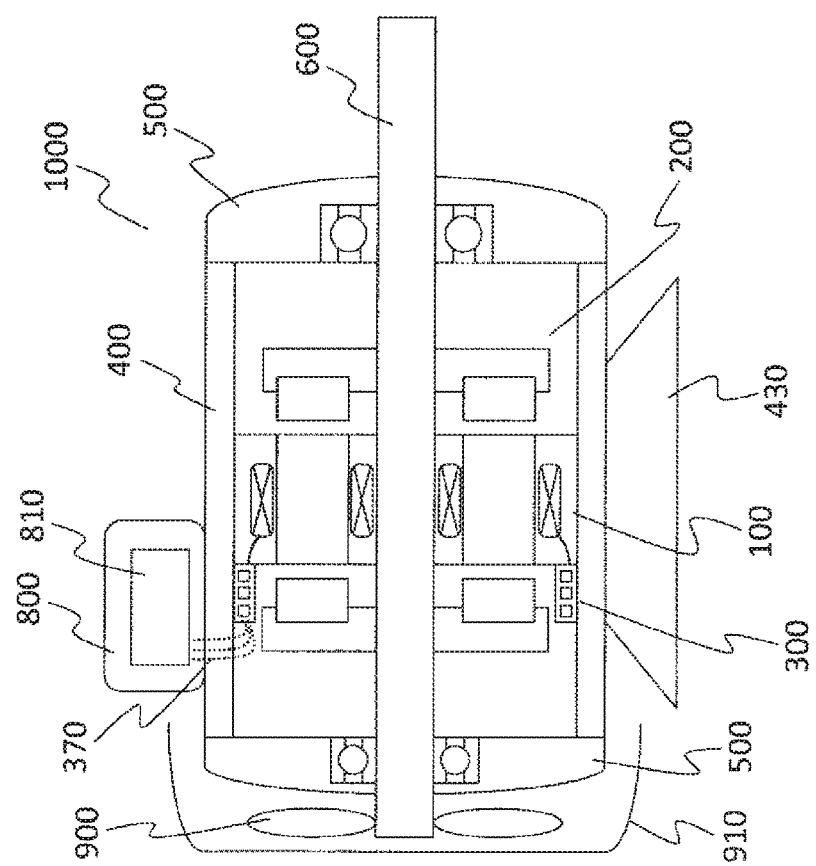
FIG. 17 is a side cross-sectional view of a motor according to a seventeenth embodiment of the present invention.

FIG. 17 is a cross-sectional view of the industrial motor of the seventeenth embodiment of the present invention. A motor 1000 has an outer fan 900 on an opposite output side of a shaft 600 directly connected to the shaft and a fan cover 910 that guides wind generated by the outer fan to a housing side. In addition, a terminal box 800 in which a terminal block 810 is built is provided on an outer side of a housing 400. A wiring board 300 is arranged to be adjacent to an opposite load side of a stator 100. A lead wire from a coil is connected to a coil connection portion, and an insulated electric wire 370 forming an external connection portion is connected to the secondary side of the terminal block 810.

According to the present embodiment, it is possible to minimize a conductor amount of a connecting portion from each coil to the terminal block, and to reduce an electrostatic capacitance formed between the connecting portion and a rotor conductor. As a result, an axial voltage of the motor is reduced, and electrolytic corrosion of a bearing can be suppressed. Since the industrial motor, such as a fan, a pump, and a compressor, is continuously operated and is used for a long period of ten years or more, it is important to configure the motor and components thereof to have a long life. To suppress the electrolytic corrosion of the bearing greatly contributes to an increase in the life of the bearing. In addition, as the connecting portion is made compact, it is possible to enlarge an outer diameter of the rotor and to achieve a high output and high efficiency. An opening for arranging a connection line between the coil and the terminal block is provided on a side surface of the housing. However, when the connecting portion is made compact by the wiring board, it is easy to arrange the opening and the connecting portion so as not to interfere with each other, and thus, the sealing of resin at the time of molding the stator also becomes easy. In addition, dimensions of the housing are roughly determined according to an output in the industrial motor. It is easy to divert a housing of a conventional radial motor to an axial gap motor. Further, a wiring working process of the connecting portion and a countermeasure against a leakage of the connecting portion during molding are greatly simplified, and thus, assemblability is improved.

Incidentally, a position of the terminal block is arbitrary, and accordingly, the wiring board may also be arranged on either the opposite load side or a load side. Structures of the coil connection portion and the external connection portion may be the same as those described in other embodiments.

Eighteenth Embodiment

An eighteenth embodiment of the present invention is obtained by using the present invention for an inverter-integrated motor.

Figure 18:
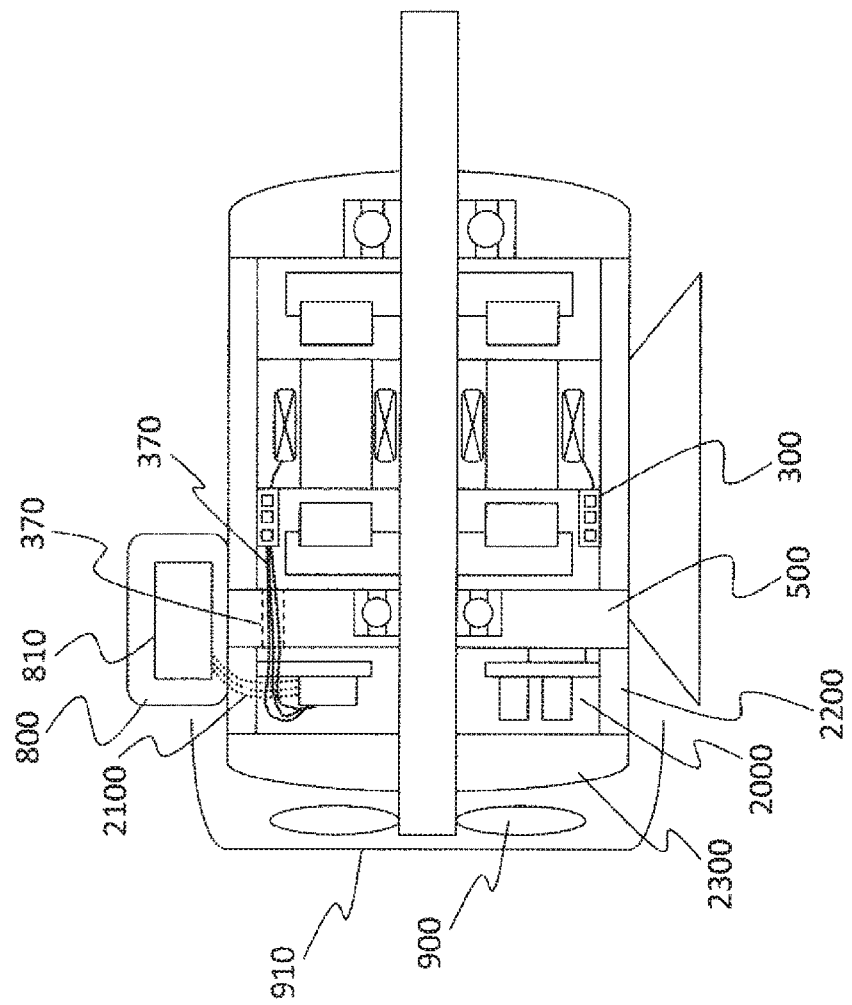
FIG. 18 is a side cross-sectional view of an inverter-integrated motor according to an eighteenth embodiment to which the present invention is applied.

FIG. 18 illustrates a cross-sectional view of an industrial motor in which an inverter is integrated according to the eighteenth embodiment of the present invention. In the present motor, an end bracket on an opposite load side, in which an inverter 2000 is arranged on the opposite load side in an axial direction of the motor, is arranged close to the motor side utilizing a thin characteristic of an axial gap motor, and an inverter storage chamber is formed of the end bracket, a side cover 2200, and an end cover 2300. An outer fan 900 directly connected to a shaft penetrating through the inverter storage chamber and a fan cover 910 are provided on the opposite load side. A terminal box 800 and a terminal block 810 are provided at an outer side of the side cover 2200. A wiring board 300 is provided on the opposite load side of a stator, and an insulated power line 370 forming an external connection portion is connected to the secondary side of the inverter 2000 via an opening of an end bracket 500 on the opposite load side. In addition, the primary side of the inverter 2000 is connected to the secondary side of the terminal block 810 via an opening of the side cover 2200.

According to the present embodiment, it is possible to minimize a conductor amount of a connecting portion from each coil to the terminal block, and to reduce an electrostatic capacitance formed between the connecting portion and a rotor conductor. As a result, an axial voltage of the motor is reduced, and electrolytic corrosion of a bearing can be suppressed. Since the industrial motor, such as a fan, a pump, and a compressor, is continuously operated and is used for a long period of ten years or more, it is important to configure the motor and components thereof to have a long life. To suppress the electrolytic corrosion of the bearing greatly contributes to an increase in the life of the bearing. In addition, as the connecting portion is made compact, it is possible to enlarge an outer diameter of the rotor and to achieve a high output and high efficiency. An opening for arranging a connection line between the coil and the terminal block is provided on a side surface of the housing. However, when the connecting portion is made compact by the wiring board, it is easy to arrange the opening and the connecting portion so as not to interfere with each other, and thus, the sealing of resin at the time of molding the stator also becomes easy. In addition, dimensions of the housing are roughly determined according to an output in the industrial motor. It is easy to divert a housing of a conventional radial motor to an axial gap motor. Further, a wiring working process of the connecting portion and a countermeasure against a leakage of the connecting portion during molding are greatly simplified, and thus, assemblability is improved. In addition, it is possible to minimize a cross-sectional area of a connection line from the motor to the inverter, and thus, the area of the opening provided on the opposite load side is minimized, and the strength is easily secured. As the insulated electric wire is used as the external connection portion, it is possible to obtain flexible connection independent of a connection portion on the inverter side. As a result, the assemblability is also improved.

REFERENCE SIGNS LIST 100 stator
110 iron core (core)
120 coil (winding)
121 drawing portion
130 bobbin
131 convex portion
132 flange portion
140 resin
150 first conductive member
160 second conductive member
200 rotor
210 permanent magnet
220 back yoke
230 yoke
300 wiring board
310 bus portion
311 end
320 coil connection portion
321 terminal
322 crimp terminal
323 protrusion
330 external connection portion
331 terminal
332 contact surface
333 screw portion
334 crimp terminal
335 bolt
340 insulating member
341 concave portion
350 ground connection portion
351 ground wire
360 sealing piece
361 tapered portion
370 insulated electric wire
380 open portion
400 housing
410 lead-out portion
420 convex portion
430 leg
500 end bracket
600 shaft
700 bearing
800 terminal box
810 terminal block
900 outer fan
910 fan cover
1000 motor
2000 inverter
2100 output line
2200 side cover
2300 end cover
3000 molding die
3100 center post
3200 upper die
3300 lower die
3310 stepped portion
3320 convex portion
3330 opening
3331 tapered portion

The invention claimed is:

1. An axial gap rotary electric machine comprising:
a stator, formed by arranging a plurality of core members circularly about a shaft in a direction in which magnetic lines are parallel with the shaft, the core member having at least an iron core and a coil wound around an outer circumference of the iron core;
at least one rotor facing the stator with a predetermined air gap interposed therebetween in a shaft axial direction; and a housing having an inner circumferential surface opposing the stator and the rotor in a radial direction, the axial gap rotary electric machine further comprising a wiring board that has: a bus portion continuous in the circumferential direction; a coil connection portion protruding from the bus portion and connected to the coil; and an external connection portion protruding from the bus portion, wherein the wiring board is arranged at an outer circumferential side of the plurality of circularly-arranged iron cores, and wherein the wiring board is arranged to be closer to the rotor than a side surface of the coil.

2. The axial gap rotary electric machine according to claim 1, wherein the rotor has a conductive portion made of a conductive member on an outer circumferential side, a first region in which the inner circumferential surface of the housing and the conductive portion of the rotor oppose each other in the radial direction and a second region, which is closer to the stator than the first region and formed up to the side surface of the coil opposing the rotor, are formed, and the wiring board is arranged such that a ratio of the bus portion of the wiring board arranged in the second region is larger than a ratio of the bus portion of the wiring board arranged in the first region.

3. The axial gap rotary electric machine according to claim 1, wherein the stator includes a bobbin formed of a tubular portion for winding the coil around an outer circumference of the iron core and a flange which is positioned at an end of the tubular portion and opposes the rotor, a first conductive member electrically connected to the housing is arranged on a side of the flange facing the rotor, and a tubular second conductive member electrically connected to the housing is arranged on an inner circumferential side of the stator opposing the shaft.

4. The axial gap rotary electric machine according to claim 3, further comprising an insulating member configured to position the bus portion on the wiring board; and a ground connection portion, which is electrically insulated from the bus portion, the coil connection portion, and the external connection portion but is electrically connected to the iron core, the first conductive member, and the second conductive member, inside the insulating member, wherein the ground connection portion is connected to the housing.

5. The axial gap rotary electric machine according to claim 1, wherein at least the wiring board and the stator are integrally molded with resin, and a part of the external connection portion is exposed from the mold.

6. The axial gap rotary electric machine according to claim 1, further comprising an insulating member configured to store and position the bus portion on the wiring board.

7. The axial gap rotary electric machine according to claim 1, wherein the wiring board is integrally molded with an insulating member so as to cover the entire wiring board except for the coil connection portion and the external connection portion.

8. The axial gap rotary electric machine according to claim 7, wherein the stator includes a bobbin formed of a tubular portion for winding the coil around an outer circumference of the iron core and a flange which is positioned at an end of the tubular portion and opposes the rotor, and the insulating member with which the wiring board is molded and the bobbin are provided with mechanisms for mutual positioning.

9. The axial gap rotary electric machine according to claim 7, wherein the insulating member with which the wiring board is molded and the housing are provided with mechanisms for mutual positioning.

10. The axial gap rotary electric machine according to claim 7, wherein the insulating member with which the wiring board is molded and a molding die of the stator are provided with mechanisms for mutual positioning.

11. The axial gap rotary electric machine according to claim 7, further comprising a sealing piece having a tapered surface whose cross section decreases toward a distal end of an output terminal of the external connection portion at a root of the external connection portion connected to the bus portion.

12. The axial gap rotary electric machine according to claim 1, wherein the bus portion of the wiring board has an open portion which is not electrically connected in the circumferential direction.

13. The axial gap rotary electric machine according to claim 1, wherein a terminal separate from the bus portion is mechanically and electrically connected to the bus portion to form the external connection portion.

14. The axial gap rotary electric machine according to claim 1, wherein the external connection portion of the wiring board is formed of a terminal portion connected to the bus portion and an insulated electric wire connected to the terminal portion.

15. The axial gap rotary electric machine according to claim 1, wherein a terminal separate from the bus portion is mechanically and electrically connected to the bus portion to form the coil connection portion.

16. The axial gap rotary electric machine according to claim 15, wherein the separate terminal is a crimp terminal.

17. The axial gap rotary electric machine according to claim 1, wherein irregularities are provided on a surface of the coil connection portion that comes into contact with the coil so that an insulating film applied on a surface of the coil is destroyed, and a protrusion is electrically connected to a conductive layer of the coil.

18. The axial gap rotary electric machine according to claim 1, wherein the housing is provided with an opening, and a terminal block is arranged at an outer side of the opening, and the external connection portion and the terminal block are electrically connected to each other.

19. The axial gap rotary electric machine according to claim 1, wherein an inverter, configured to drive the rotary electric machine, is integrally arranged at a position adjacent to the housing, and the external connection portion and a secondary-side terminal of the inverter are electrically connected to each other.

\* \* \* \* \*